(12) United States Patent
Mizokami

(10) Patent No.: US 10,897,211 B2
(45) Date of Patent: Jan. 19, 2021

(54) POWER CONVERSION APPARATUS CAPABLE OF PERFORMING STEP-UP/STEP-DOWN OPERATION

(71) Applicant: OMRON Corporation, Kyoto (JP)

(72) Inventor: Takao Mizokami, Ritto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/790,698

(22) Filed: Feb. 13, 2020

(65) Prior Publication Data

US 2020/0266716 A1  Aug. 20, 2020

(30) Foreign Application Priority Data

Feb. 19, 2019 (JP) ................. 2019-027723

(51) Int. Cl.
*H02M 3/335* (2006.01)
*H02M 1/00* (2006.01)

(52) U.S. Cl.
CPC .......... *H02M 3/33584* (2013.01); *H02M 2001/0058* (2013.01)

(58) Field of Classification Search
CPC .......... H02M 3/33584; H02M 3/3376; H02M 2001/0048; H02M 2001/0058
See application file for complete search history.

(56) References Cited

U.S. PATENT DOCUMENTS

| | | | |
|---|---|---|---|
| 9,270,189 B2* | 2/2016 | Rosado | H02M 3/33584 |
| 9,987,937 B1* | 6/2018 | Mohamed | H02M 7/797 |
| 10,050,534 B1* | 8/2018 | Murthy-Bellur | H02M 3/24 |
| 10,110,138 B1* | 10/2018 | Murthy-Bellur | H02M 3/33584 |
| 10,122,367 B1* | 11/2018 | Albertini | H02M 1/088 |
| 2011/0249472 A1* | 10/2011 | Jain | H02M 3/33584 363/15 |
| 2014/0185328 A1* | 7/2014 | Rosado | H02M 3/33576 363/17 |

(Continued)

FOREIGN PATENT DOCUMENTS

| | | |
|---|---|---|
| CN | 104054249 | 9/2014 |
| CN | 107005168 | 8/2017 |

(Continued)

OTHER PUBLICATIONS

"Office Action of Taiwan Counterpart Application", dated Sep. 3, 2020, with English translation thereof, pp. 1-11.

*Primary Examiner* — Yusef A Ahmed
(74) *Attorney, Agent, or Firm* — JCIPRNET

(57) ABSTRACT

An output voltage is suppressed from changing and high efficiency is realized in a power conversion apparatus capable of performing a step-up/step-down operation. In a power conversion apparatus including a DAB DC/DC converter, when energy transmitted from a primary side and energy accumulated in a reactor at a secondary side are output from the secondary side, of a control signal of a first switching element and a control signal of a fourth switching element which are both in ON states, the first and fourth switching elements being diagonal to each other in a full bridge at the primary side, a period Toff2 in which the control signal of the first switching element is turned off before the control signal of the fourth switching element is turned off is controlled, and thereby a step-up/step-down ratio is continuously changed.

1 Claim, 15 Drawing Sheets

(56) References Cited

U.S. PATENT DOCUMENTS

| | | | | |
|---|---|---|---|---|
| 2014/0254203 A1* | 9/2014 | Dai | .............. | H02M 3/3353 363/17 |
| 2015/0015181 A1* | 1/2015 | Kondo | .............. | H02J 7/342 320/103 |
| 2015/0021998 A1* | 1/2015 | Trescases | .............. | H02J 3/381 307/46 |
| 2015/0229225 A1* | 8/2015 | Jang | .............. | H02M 3/33569 363/17 |
| 2016/0087545 A1* | 3/2016 | Higaki | .............. | H02J 7/342 363/17 |
| 2016/0099646 A1* | 4/2016 | Safaee | .............. | H02M 3/33507 363/17 |
| 2016/0344297 A1* | 11/2016 | Lee | .............. | H02M 3/33584 |
| 2016/0352236 A1* | 12/2016 | Yoo | .............. | H02M 3/33584 |
| 2017/0170738 A1* | 6/2017 | El-Barbari | .............. | H02M 3/33546 |
| 2017/0187297 A1* | 6/2017 | Narita | .............. | H02M 3/33584 |
| 2017/0237355 A1* | 8/2017 | Stieneker | .............. | H02M 1/14 363/17 |
| 2017/0294845 A1* | 10/2017 | Kusama | .............. | H02M 7/4807 |
| 2017/0310212 A1* | 10/2017 | Higaki | .............. | H02M 3/33584 |
| 2017/0324334 A1* | 11/2017 | Fujihata | .............. | H02M 3/24 |
| 2017/0324335 A1* | 11/2017 | Suetomi | .............. | H02M 3/24 |
| 2017/0324336 A1* | 11/2017 | Suetomi | .............. | H02M 3/33584 |
| 2017/0324337 A1* | 11/2017 | Suetomi | .............. | H02M 3/26 |
| 2017/0358996 A1* | 12/2017 | Higaki | .............. | H02M 1/083 |
| 2018/0048240 A1* | 2/2018 | Hayasaki | .............. | H02M 3/3376 |
| 2018/0054136 A1* | 2/2018 | Jimichi | .............. | H02M 1/08 |
| 2018/0323616 A1* | 11/2018 | Sun | .............. | H02J 3/382 |
| 2019/0173387 A1* | 6/2019 | Tanaka | .............. | H02M 1/08 |
| 2019/0190299 A1* | 6/2019 | Mohamed | .............. | B60L 53/14 |
| 2019/0190393 A1* | 6/2019 | Murakami | .............. | H02M 3/33561 |
| 2019/0341855 A1* | 11/2019 | Kim | .............. | H02J 3/385 |
| 2019/0372471 A1* | 12/2019 | Peng | .............. | H02M 3/33584 |
| 2020/0014307 A1* | 1/2020 | Kidera | .............. | H02M 3/33584 |
| 2020/0144926 A1* | 5/2020 | Murakami | .............. | H02M 3/33576 |
| 2020/0186046 A1* | 6/2020 | Tanaka | .............. | H02M 1/08 |
| 2020/0234869 A1* | 7/2020 | Ishibashi | .............. | H02M 3/28 |
| 2020/0274457 A1* | 8/2020 | Kajiyama | .............. | H02M 1/083 |

FOREIGN PATENT DOCUMENTS

| | | |
|---|---|---|
| EP | 3244525 | 11/2017 |
| JP | 2017-130997 | 7/2017 |
| JP | 2017-204998 | 11/2017 |
| TW | 201308851 | 2/2013 |
| WO | 2015004825 | 1/2015 |

* cited by examiner

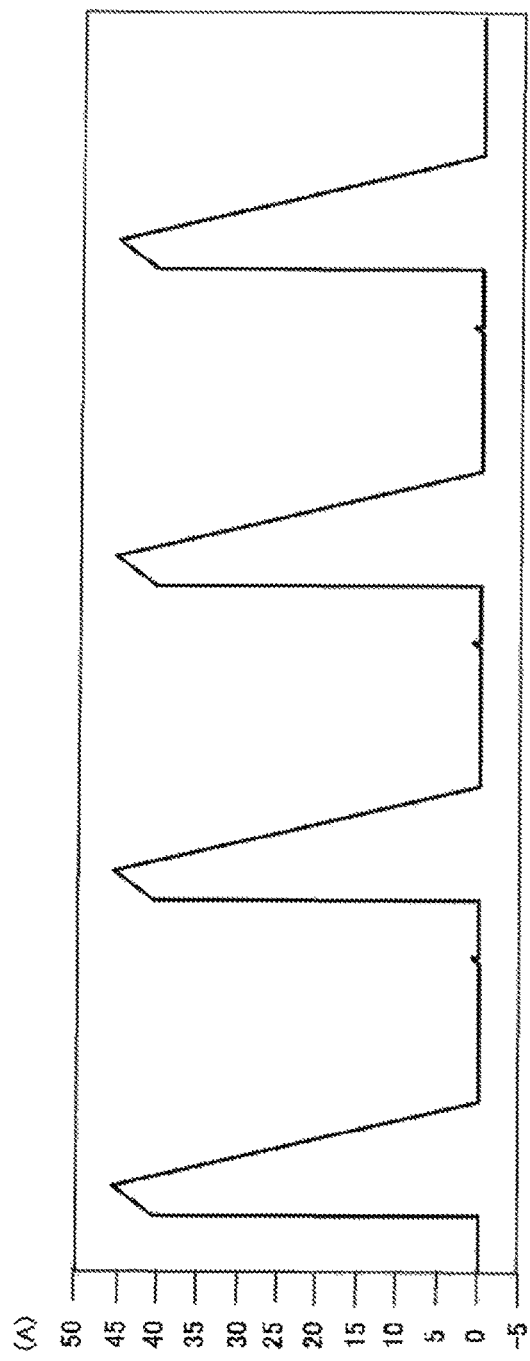
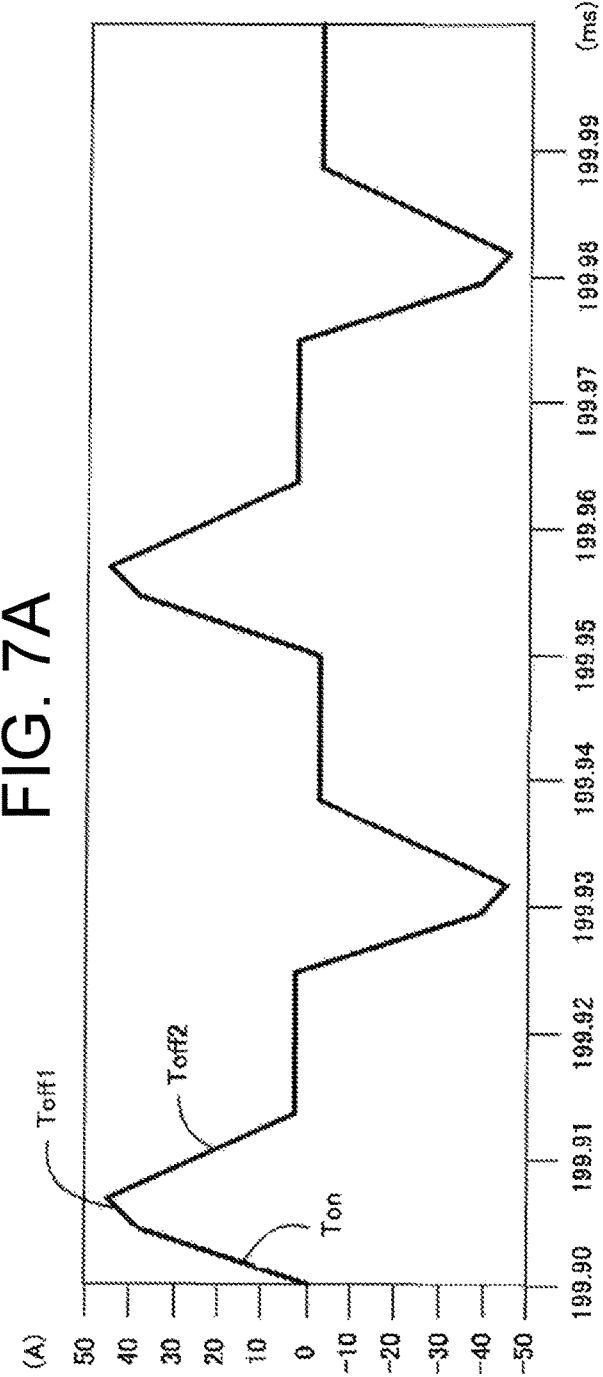

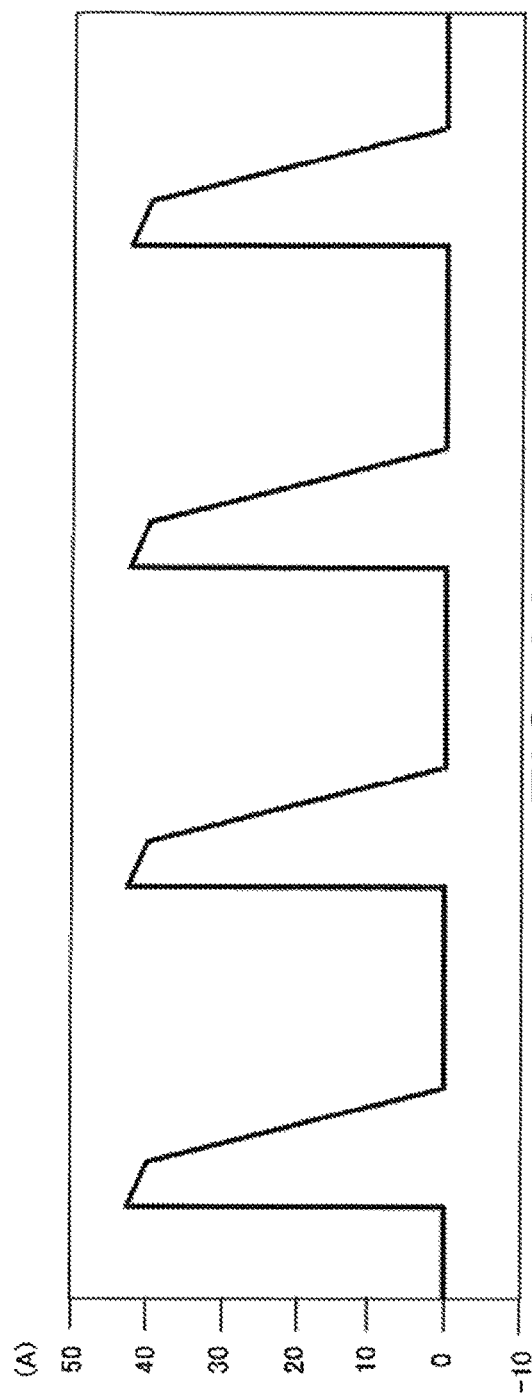
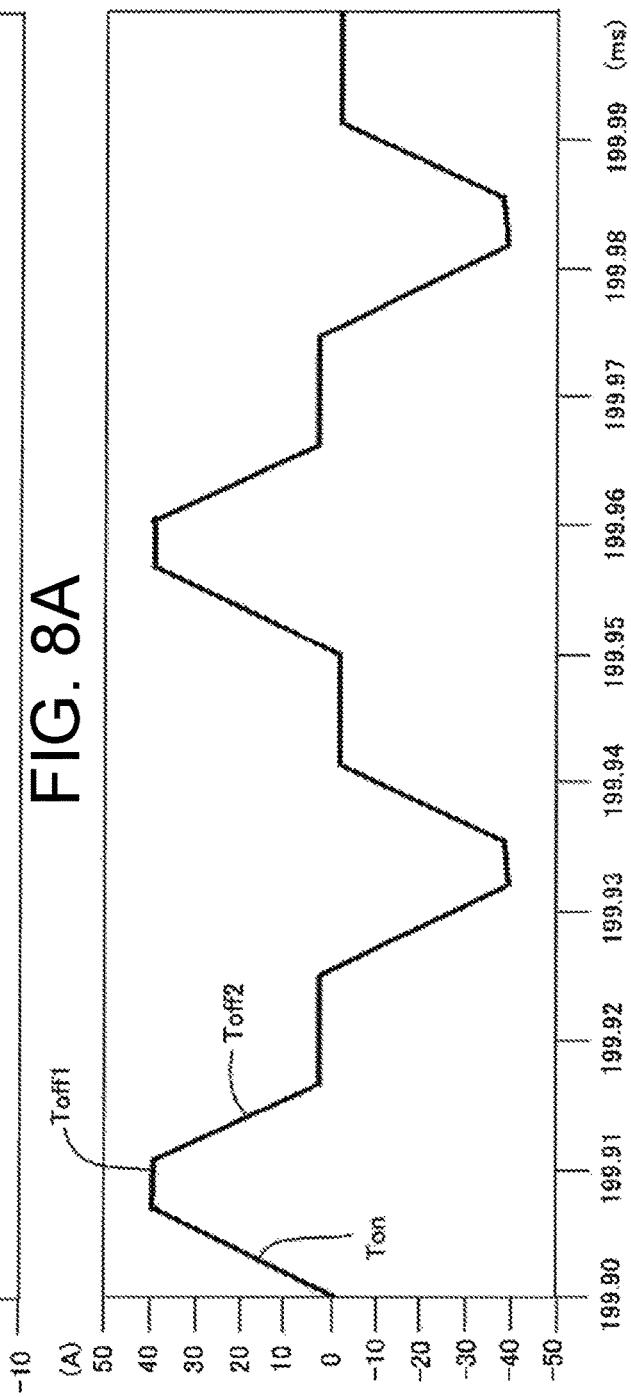
FIG. 8A
FIG. 8B

POWER CONVERSION APPARATUS CAPABLE OF PERFORMING STEP-UP/STEP-DOWN OPERATION

CROSS-REFERENCE TO RELATED APPLICATION

This application claims the priority benefit of Japan Application No. 2019-027723, filed on Feb. 19, 2019. The entirety of the above-mentioned patent application is hereby incorporated by reference herein and made a part of this specification.

BACKGROUND OF THE DISCLOSURE

Technical Field

The disclosure relates to a power conversion apparatus.

Related Art

Conventionally, an isolated bidirectional DC/DC converter that is capable of performing a step-up/step-down operation is proposed as a power conversion apparatus.

As the isolated bidirectional DC/DC converter, a dual active bridge (DAB) DC/DC converter including full bridge circuits at both of a primary side and a secondary side of a transformer is proposed (for example, see Japanese Patent Laid-open No. 2017-204998 and No. 2017-130997).

Here, in the conventional isolated bidirectional DC/DC converter as described above, in order to realize high efficiency, a method for switching between a step-up chopper and a step-down chopper is proposed; however, a problem arises in that an output voltage will change during the switching in some cases.

The disclosure provides a technology by which it is possible to limit an output voltage from changing and to realize high efficiency in a power conversion apparatus that is capable of performing a step-up/step-down operation.

SUMMARY

The disclosure provides a power conversion apparatus including:

a first input/output terminal pair;

a second input/output terminal pair;

a DC/DC converter connected to the first input/output terminal pair and the second input/output terminal pair; and a controller that controls the DC/DC converter;

wherein the DC/DC converter includes:

a first switching leg which has a first switching element and a second switching element that are connected in series via a first connection point and which is connected to the first input/output terminal pair;

a second switching leg which has a third switching element and a fourth switching element that are connected in series via a second connection point and which is connected to the first switching leg in parallel;

a third switching leg which has a fifth switching element and a seventh switching element that are connected in series via a third connection point and which is connected to the second input/output terminal pair;

a fourth switching leg which has a sixth switching element and an eighth switching element that are connected in series via a fourth connection point and which is connected to the third switching leg in parallel;

a first energy accumulating/converting unit which is connected to the first connection point and the second connection point and includes one winding wire of a transformer; and a second energy accumulating/converting unit which is connected to the third connection point and the fourth connection point and includes another winding wire of the transformer; and at least one of the first energy accumulating/converting unit and the second energy accumulating/converting unit has a reactor which is connected to the winding wires of the transformer in series;

wherein in a state that the seventh switching element and the eighth switching element are turned off, the controller has a first state that the first switching element and the fourth switching element are turned on, the second switching element and the third switching element are turned off, the fifth switching element is turned on, and the sixth switching element is turned off, a second state that the first switching element and the fourth switching element are turned on, the second switching element and the third switching element are turned off, and the fifth switching element and the sixth switching element are turned off, a third state that the first switching element is turned off, the fourth switching element is turned on, the second switching element and the third switching element are turned off, and the fifth switching element and the sixth switching element are turned off, a fourth state that the second switching element and the third switching element are turned on, the first switching element and the fourth switching element are turned off, the sixth switching element is turned on, and the fifth switching element is turned off, a fifth state that the second switching element and the third switching element are turned on, the first switching element and the fourth switching element are turned off, and the fifth switching element and the sixth switching element are turned off, and a sixth state that the third switching element is turned on, the second switching element is turned off, the first switching element and the fourth switching element are turned off, and the sixth switching element and the fifth switching element are turned off, and wherein the control unit repeats and executes transition from the first state, the second state, the third state, the fourth state, the fifth state, and the sixth state in this order, and the control unit controls periods of the third state and the sixth state.

BRIEF DESCRIPTION OF THE DRAWINGS

FIG. 7A and FIG. 7B are graphs illustrating a simulation result in Example 1 of the disclosure.

FIG. 8A and FIG. 8B are graphs illustrating another simulation result in Example 1 of the disclosure.

DESCRIPTION OF THE EMBODIMENTS

Application Example

Figure 1:
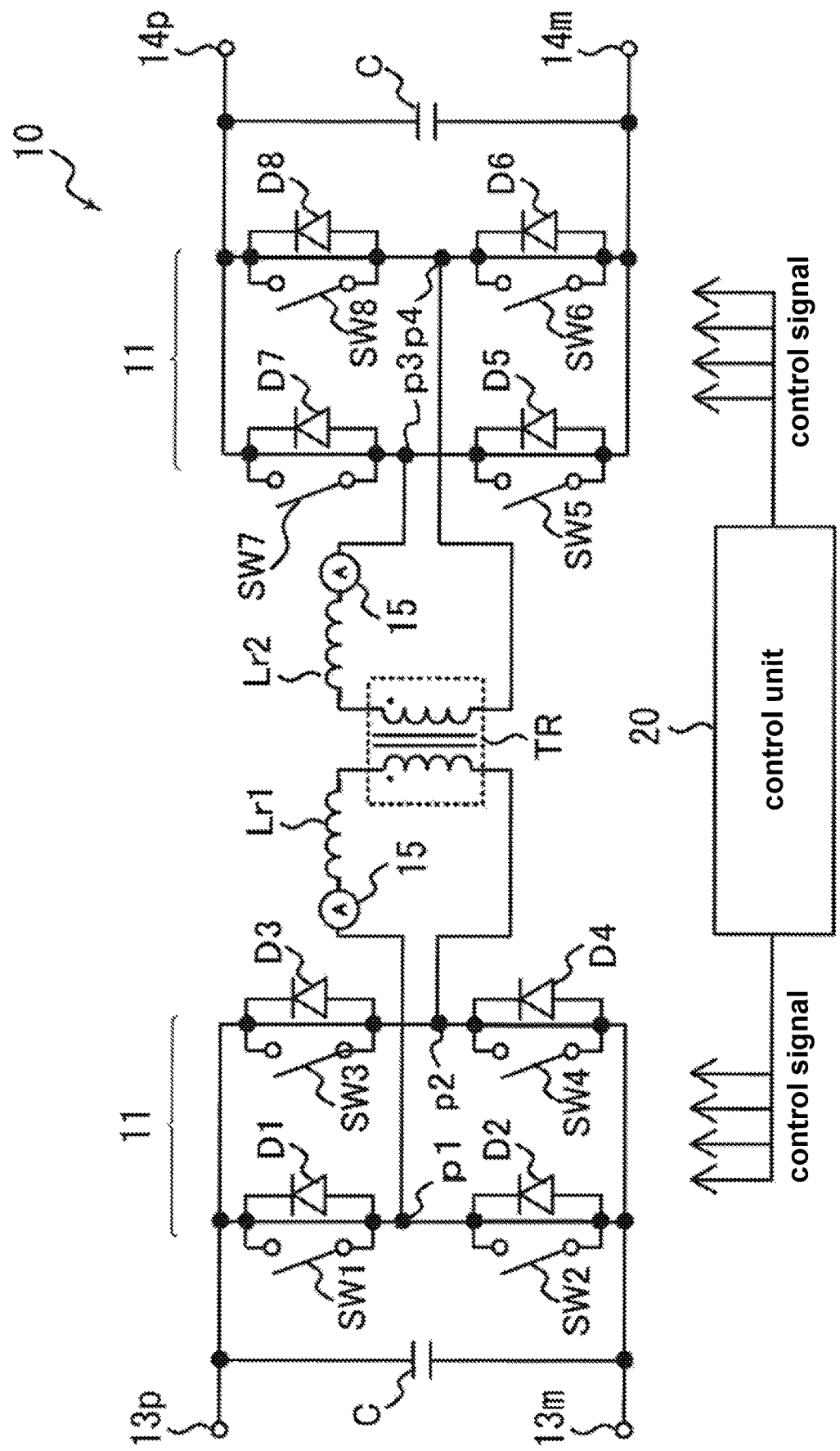
FIG. 1 is a schematic configurational diagram of a power conversion apparatus according to Example 1 of the disclosure.

Hereinafter, an application example of the disclosure is described with reference to the drawings. The disclosure is applied to, for example, a power conversion apparatus including a DAB DC/DC converter as illustrated in FIG. 1.

Figure 10A:
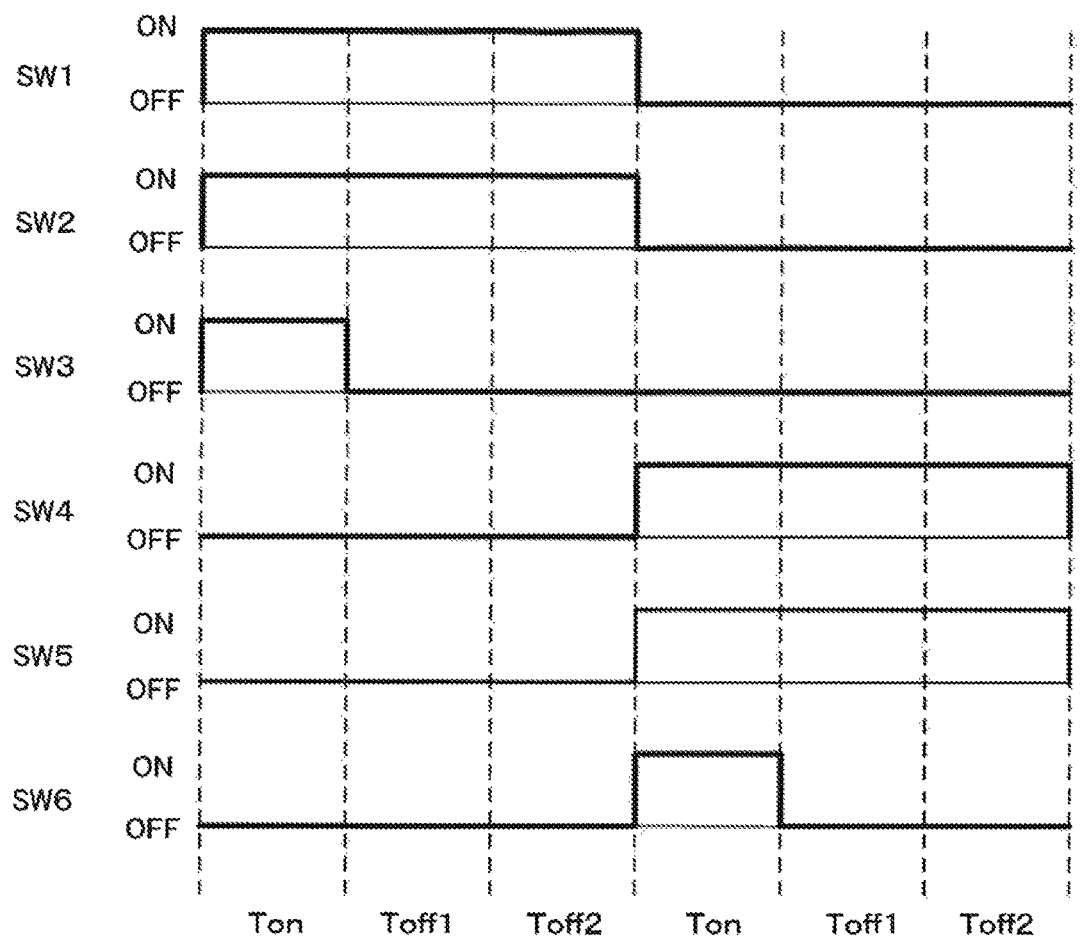
FIG. 10A and FIG. 10B are timing charts illustrating control of a power conversion apparatus and a graph of a reactor current in a conventional example.
Figure 10B:
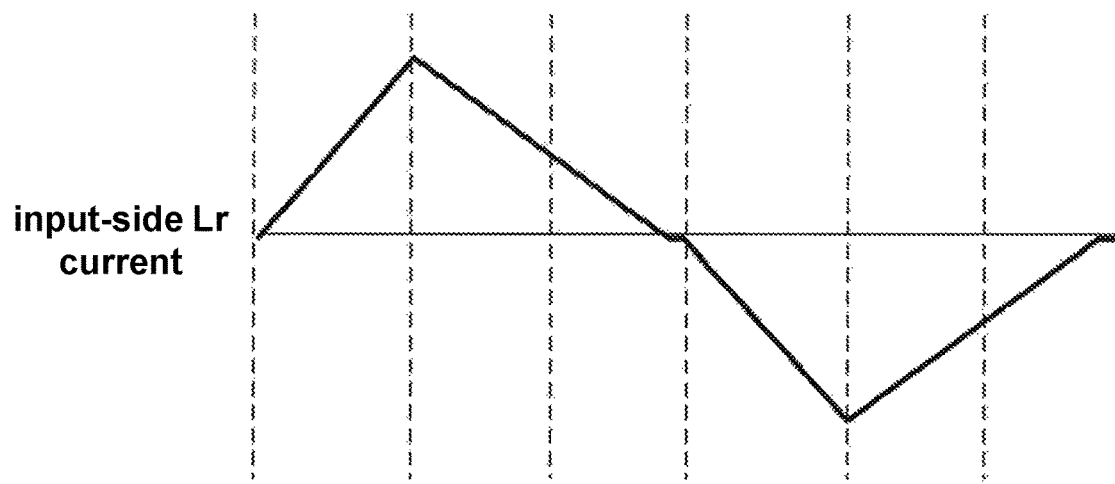

The DAB DC/DC converter having a similar configuration is conventionally known; however, in the related art, when a step-up operation is performed, switching elements SW1 to SW6 are subjected to ON/OFF control in accordance with a timing chart illustrated in FIG. 10A. FIG. 10B illustrates an electric current flowing to a reactor at an input side of the conventional DC/DC converter at that time.

Figure 3:
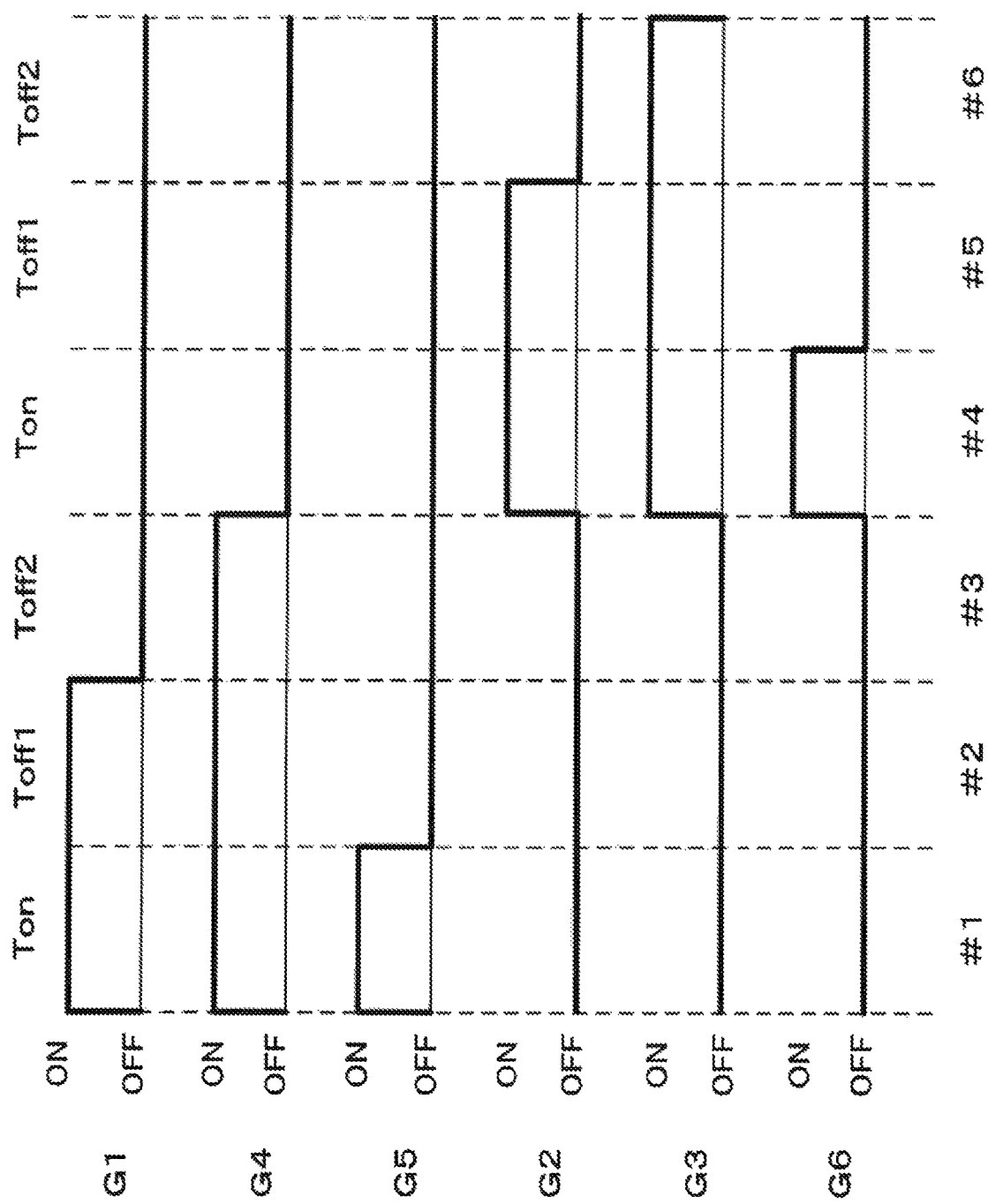
FIG. 3 is a timing chart illustrating control of the power conversion apparatus according to Example 1 of the disclosure.

Vertical dotted lines in FIG. 10A and FIG. 10B are drawn for a comparison with the control in a power conversion apparatus according to an example of the disclosure illustrated in FIG. 3 and do not necessarily correspond to the conventional control.

That is, in the disclosure, transition is performed from a first state (#1) that the first switching element SW1, the fourth switching element SW4, and the fifth switching element SW5 are turned on, through a second state (#2) that the first switching element SW1 and the fourth switching element SW4 are turned on, and the fifth switching element SW5 is turned off, to a third state (#3). In the third state (#3), the first switching element SW1 is turned off, the fourth switching element SW4 is turned on, and the fifth switching element SW5 is turned off. In the above control, the DC/DC converter 10 of the disclosure allows an electric current to flow in a route illustrated in FIG. 2C. At this time, without supply of electric power from a first input/output terminal pair 13p and 13m, the electric current flowing via a first reactor and a second reactor is circulated. On the other hand, an electric current from a secondary-side input/output terminal pair 14p and 14m flows to a load, and an energy loss occurs.

Compared with the conventional example in which the third state (#3) is not arranged, the electric current flowing to the reactor at an input side rapidly decreases. In the disclosure, a period of the third state (the same applies to the sixth state) is controlled, and thereby a step-up/step-down ratio is continuously controlled. Consequently, in the disclosure, an output voltage is suppressed from changing, and high efficiency is realized.

As illustrated in FIG. 10B, in the conventional example in which the control corresponding to the third state in the disclosure is not performed, a degree of decrease in the reactor current at the input side is constant, and the above effects cannot be realized.

Example 1

Hereinafter, a power conversion apparatus according to Example 1 of the disclosure will be described in more detail with reference to the drawings.

<Configuration of Apparatus>

FIG. 1 is a schematic configurational diagram illustrating an example of the power conversion apparatus according to Example 1.

The power conversion apparatus according to this example is a dual active bridge (DAB) DC/DC converter and is an apparatus in which bidirectional power conversion can be performed via a transformer TR. As illustrated in FIG. 1, the power conversion apparatus includes a DC/DC converter 10, a control unit 20, a first input/output terminal pair 13 (13p and 13m), and a second input/output terminal pair 14 (14p and 14m). Here, the control unit 20 corresponds to a controller.

The DC/DC converter 10 is an isolated bidirectional DC/DC converter including, as main configurational elements, the transformer TR, two reactors Lr1 and Lr2, and two full bridge circuits 11. Hereinafter, the full bridge circuit 11 at a left-hand side and the full bridge circuit 11 at a right-hand side in FIG. 1 are referred to as a first full bridge circuit 11 and a second full bridge circuit 11, respectively. A winding wire at the left-hand side and a winding wire at the right-hand side of the transformer TR in FIG. 1 are referred to as a first winding wire and a second winding wire, respectively. Moreover, the transformer TR of the DC/DC converter 10 may not have a winding wire ratio of 1:1. However, hereinafter, a configuration and an operation of the power conversion apparatus will be described assuming that the winding wire ratio of the transformer TR in the power conversion apparatus is 1:1. A first energy accumulating/converting unit is configured by a first winding wire and the reactor Lr1, and a second energy accumulating/converting unit is configured by the second winding wire and the reactor Lr2.

The first full bridge circuit 11 of the DC/DC converter 10 includes a first switching leg having the first switching element SW1 and the second switching element SW2 which are connected in series and a second switching leg having the third switching element SW3 and the fourth switching element SW4 which are connected in series. As illustrated in FIG. 1, a diode Dn is connected in parallel between terminals of an n-th switching element SWn (n=1 to 4) of each switching leg. In addition, each of the switching legs is connected to the pair of first input/output terminals 13p and 13m, and a connection point p1 between the first and second switching elements SW1 and SW2 of the first switching leg is connected to one end of a first winding wire of the transformer TR via the first reactor. Besides, a connection point p2 between the third and fourth switching elements SW3 and SW4 of the second switching leg is connected to the other end of the first winding wire of the transformer TR. Here, the connection point p1 and the connection point p2 correspond to a first connection point and a second connection point, respectively.

The second full bridge circuit 11 of the DC/DC converter 10 includes a third switching leg having the fifth switching element SW5 and a seventh switching element SW7 which are connected in series and a fourth switching leg having the sixth switching element SW6 and an eighth switching element SW8 which are connected in series. As illustrated in FIG. 1, a diode Dn is connected in parallel between terminals of an n-th switching element SWn (n=5 to 8) of each switching leg. In addition, both the third switching leg and the fourth switching leg are connected to the second input/output terminal pair 14p and 14m. Besides, a connection point p3 between the fifth switching element SW5 and the seventh switching element SW7 of the third switching leg is connected to one end of a second winding wire of the transformer TR via the second reactor, and a connection point p4 between the sixth switching element SW6 and the eighth switching element SW8 of the fourth switching leg is connected to the other end of the second winding wire of the transformer TR. Here, the connection point p3 and the connection point p4 correspond to a third connection point and a fourth connection point, respectively.

A current sensor 15 for measuring a magnitude of an electric current flowing through the second reactor Lr2 is attached to the DC/DC converter 10. Moreover, various sensors (not illustrated) for measuring magnitudes of input and output voltages or input and electric currents are attached to the DC/DC converter 10.

The control unit 20 is a unit that changes a level of a control signal to each of the switching elements in the DC/DC converter 10 to thereby control the DC/DC converter 10 (ON/OFF of the switching elements in the DC/DC converter 10). Hereinafter, a control signal for an n-th switching element SWn (n=1 to 8) is represented as a control signal Gn.

The control unit 20 is configured of a processor (in this example, microcontroller), a gate driver, or the like, and outputs of the various sensors (the current sensor 15 and the like) are input to the control unit 20.

Besides, the control unit 20 is configured (programmed) to determine an operation of the DC/DC converter 10 based on input data (current value and voltage value) and to control the DC/DC converter 10 such that the determined operation is performed.

Hereinafter, an operation of the power conversion apparatus according to this example will be specifically described.

First, basic control details of the DC/DC converter 10 which are performed by the control unit 20 are described. Moreover, control signals G1 to G6 described later actually indicate that ON and OFF of two switching elements (ON of the first switching element SW1, OFF of the second switching element SW2, and the like) are performed with a time lag (so-called dead time). However, in order to avoid complicated description, an operation of the control unit 20 will be described hereinafter as an operation performed without the time lag.

FIG. 2A to FIG. 2F illustrate diagrams of electric current routes at a primary side and a secondary side of the DC/DC converter 10 in a case that the control unit 20 causes the DC/DC converter 10 to function as a step-up/step-down converter. Moreover, in FIG. 2A to FIG. 2F, an "input current" is an electric current flowing into the first input/output terminal 13p, and an "output current" is an electric current flowing out of the second input/output terminal 14p. In addition, an "input-side Lr current" is an electric current flowing in the first reactor Lr1, and an "output-side Lr current" is an electric current flowing in the second reactor Lr2.

Figure 4:
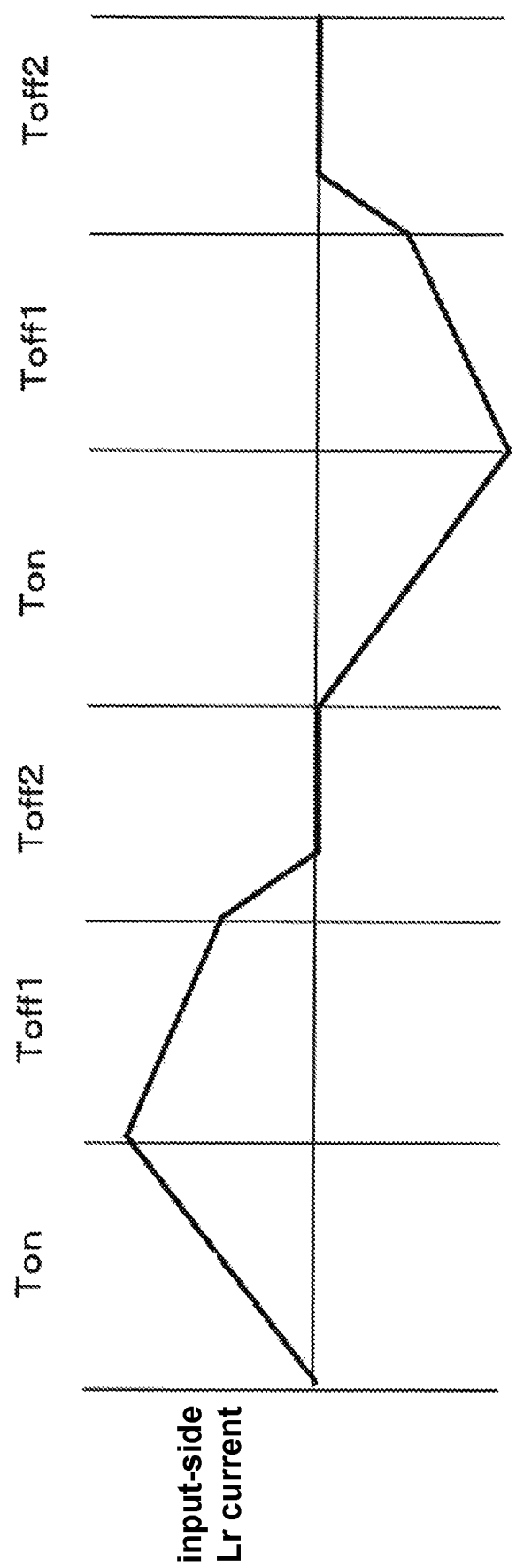
FIG. 4 is a graph illustrating a reactor current during a step-up operation of the power conversion apparatus in Example 1 of the disclosure.

In this example, the control unit 20 outputs the control signals G1 to G6 which change with time as illustrated in FIG. 3. In this example, since the seventh switching element SW7 and the eighth switching element SW8 are under OFF control, control signals G7 and G8 of the switching elements are omitted. FIG. 4 is a graph illustrating a change in the electric current flowing in the first reactor Lr1.

Hence, when the control unit 20 operates the DC/DC converter 10 as a step-up/step-down converter, a state of the DC/DC converter 10 is subjected to repetition and transition between the following six states of a first state (#1), a second state (#2), a third state (#3), a fourth state (#4), a fifth state (#5), a sixth state (#6) in this order. A corresponding relationship between the control signals G1 to G6 and the respective states is illustrated at the bottom of FIG. 3.

First state (#1): a state that the first switching element SW1, the fourth switching element SW4, and the fifth switching element SW5 are turned on (state that the first switching element SW1, the fourth switching element SW4, and the fifth switching element SW5 are turned on, and the other switching elements are turned off; the same applies hereinafter), Second state (#2): a state that the first switching element SW1 and the fourth switching element SW4 are turned on, Third state (#3): a state that the fourth switching element SW4 is turned on, Fourth state (#4): a state that the second switching element SW2, the third switching element SW3, and the sixth switching element SW6 are turned on, Fifth state (#5): a state that the second switching element SW2 and the third switching element SW3 are turned on, and Sixth state (#6): a state that the third switching element SW3 is turned on.

Figure 2A:
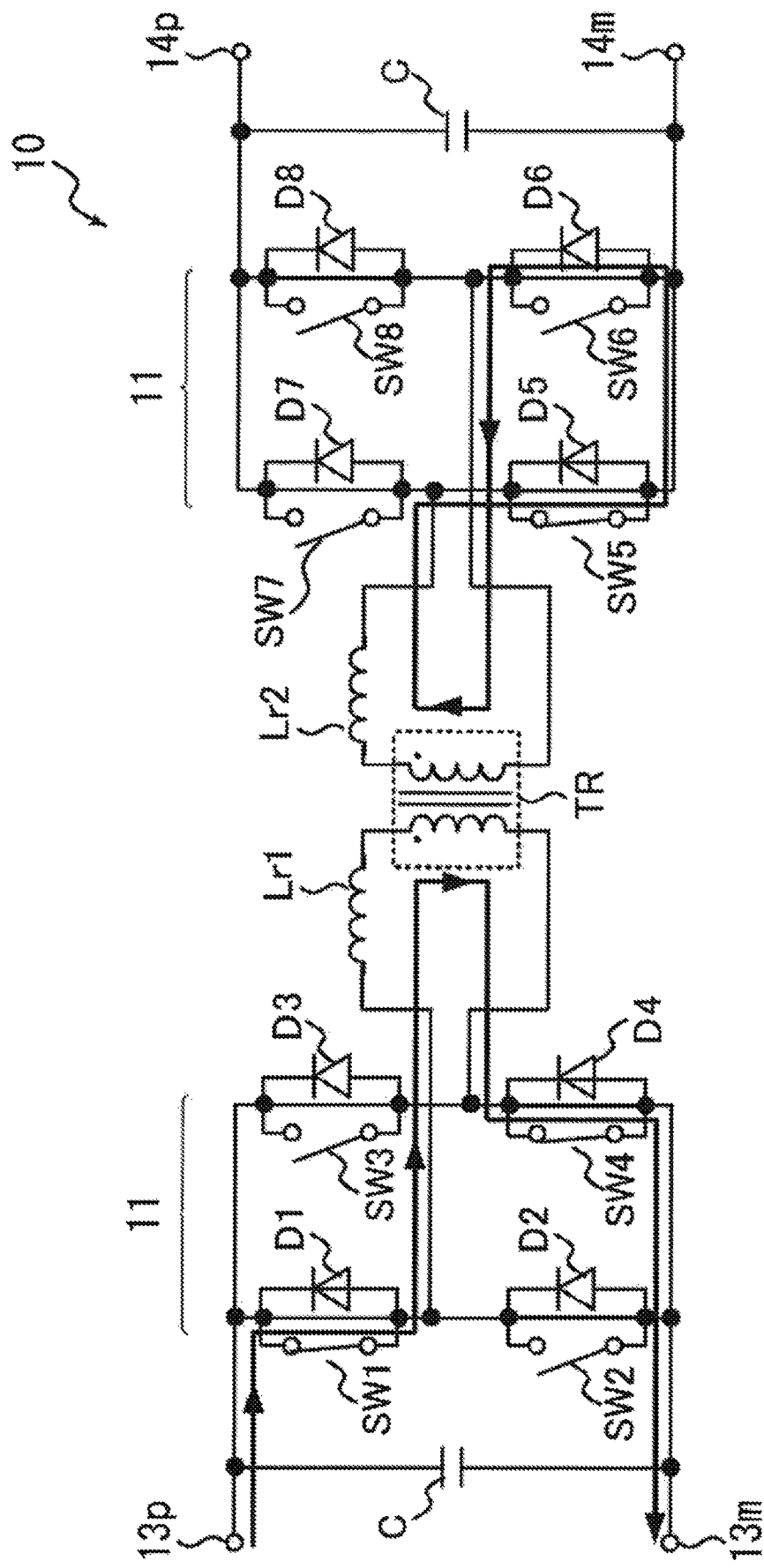
FIG. 2A is a diagram illustrating an electric current route in a first state of the power conversion apparatus in Example 1 of the disclosure.

When the DC/DC converter 10 is in the first state #1 (that is, when SW1, SW4, and SW5 are turned on), an electric current flows in a route from the first input/output terminal 13p through the first switching element SW1→the first reactor Lr1→the transformer TR→the fourth switching element SW4→the first input/output terminal 13m, as illustrated in FIG. 2A. Hence, energy is accumulated in the first reactor Lr1 and the input-side Lr current rises, as illustrated in FIG. 4. In addition, the energy is transmitted to the secondary side via the transformer TR. However, the fifth switching element SW5 of the second full bridge circuit 11 is turned on, and thus an electric current is circulated in a route of the diode D6→the transformer TR→the second reactor Lr2→the fifth switching element SW5 at the secondary side of the DC/DC converter 10, as illustrated in FIG. 2A. Hence, the energy from the primary side is accumulated in the second reactor Lr2 without being output from the second input/output terminal pair 14.

Figure 2B:
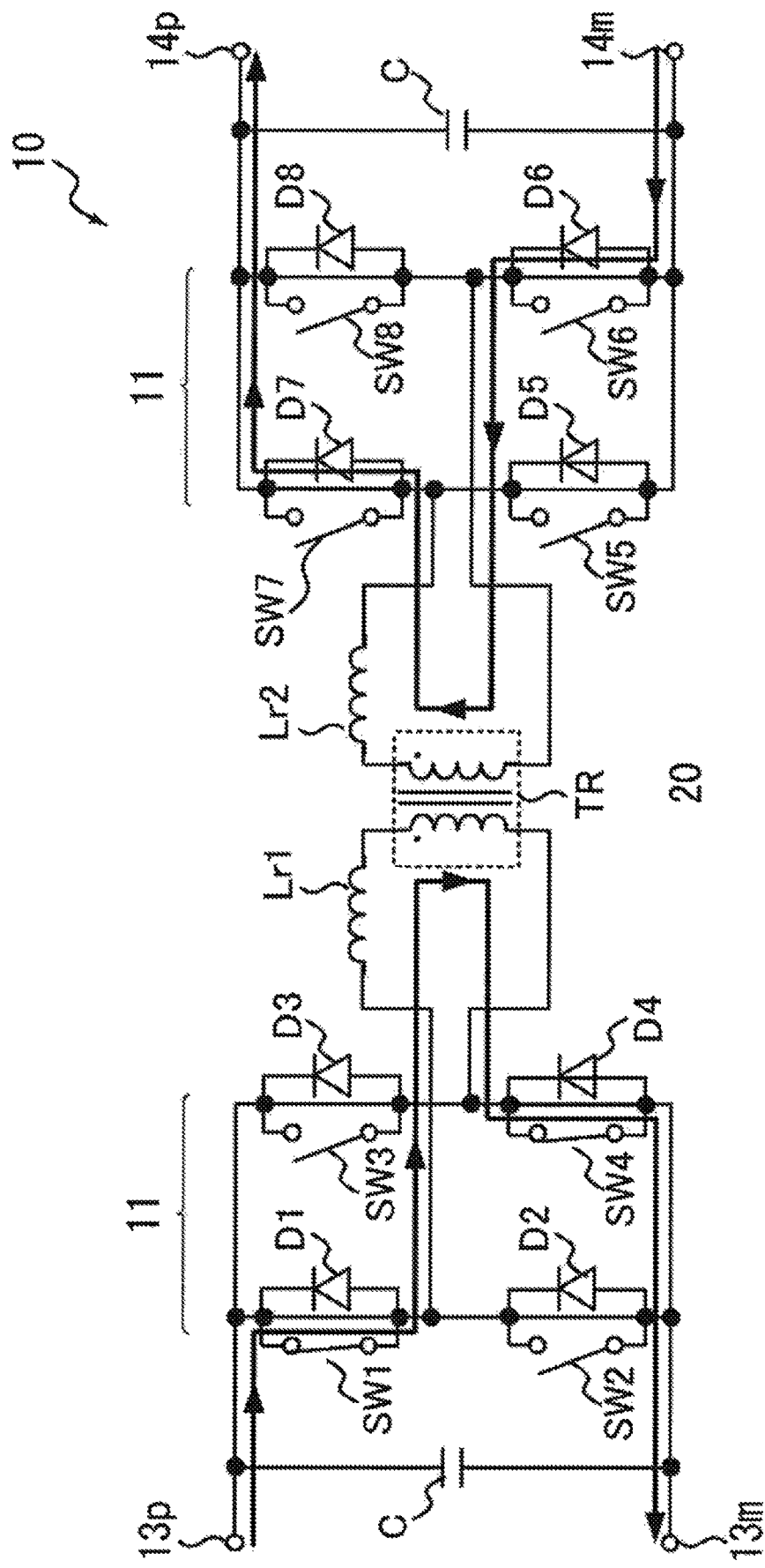
FIG. 2B is a diagram illustrating an electric current route in a second state of the power conversion apparatus in Example 1 of the disclosure.

When the fifth switching element SW5 is turned off and the DC/DC converter 10 comes into the second state (#2), as illustrated in FIG. 2B, the energy accumulated in the first reactor Lr1 and the energy from a power supply are transmitted to the secondary side to be added to the energy accumulated in the second reactor Lr2, and an electric current rectified by the second full bridge circuit 11 is output from the second input/output terminal pair 14.

Figure 5:
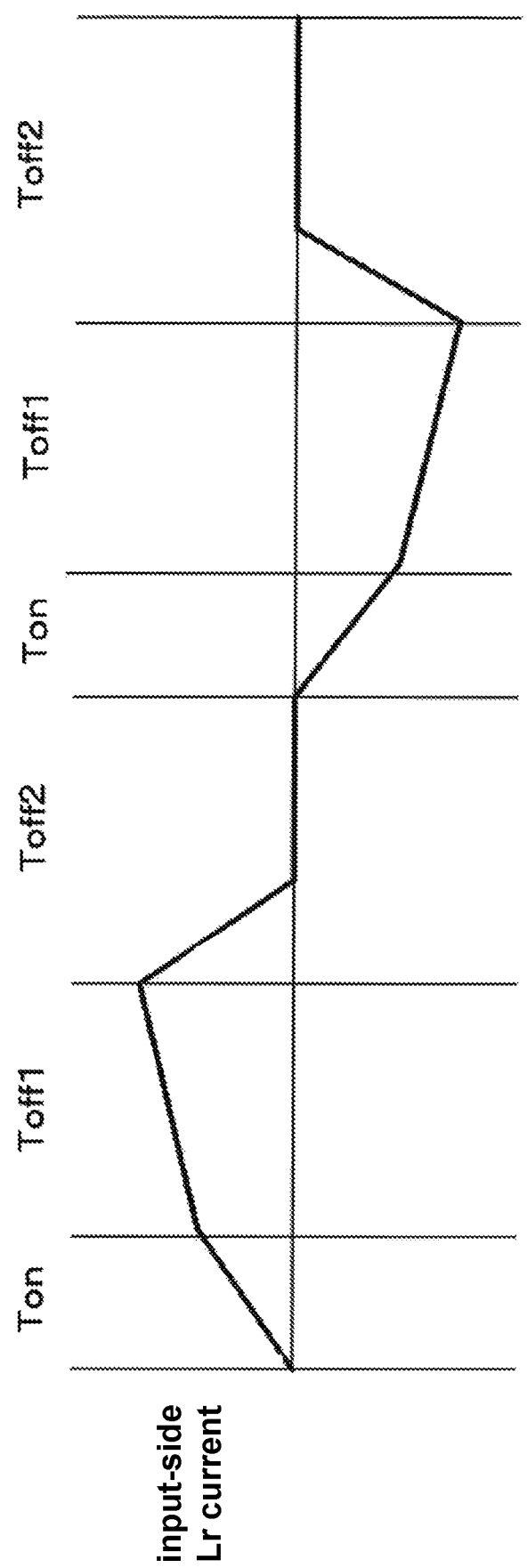
FIG. 5 is a graph illustrating a reactor current during a step-down operation of the power conversion apparatus in Example 1 of the disclosure.

An output voltage of a load is applied to the second input/output terminal pair 14, and thus an input current, an input-side Lr current, and an output current when the DC/DC converter 10 comes into the second state (#2) gradually decrease as illustrated in FIG. 4 when the output voltage is higher than the input voltage. Conversely, when the input voltage is higher than the output voltage, the currents gradually increase as illustrated in FIG. 5. Besides, the first switching element SW1 is turned off, and the state of the DC/DC converter 10 transitions to the third state (#3).

Figure 2C:
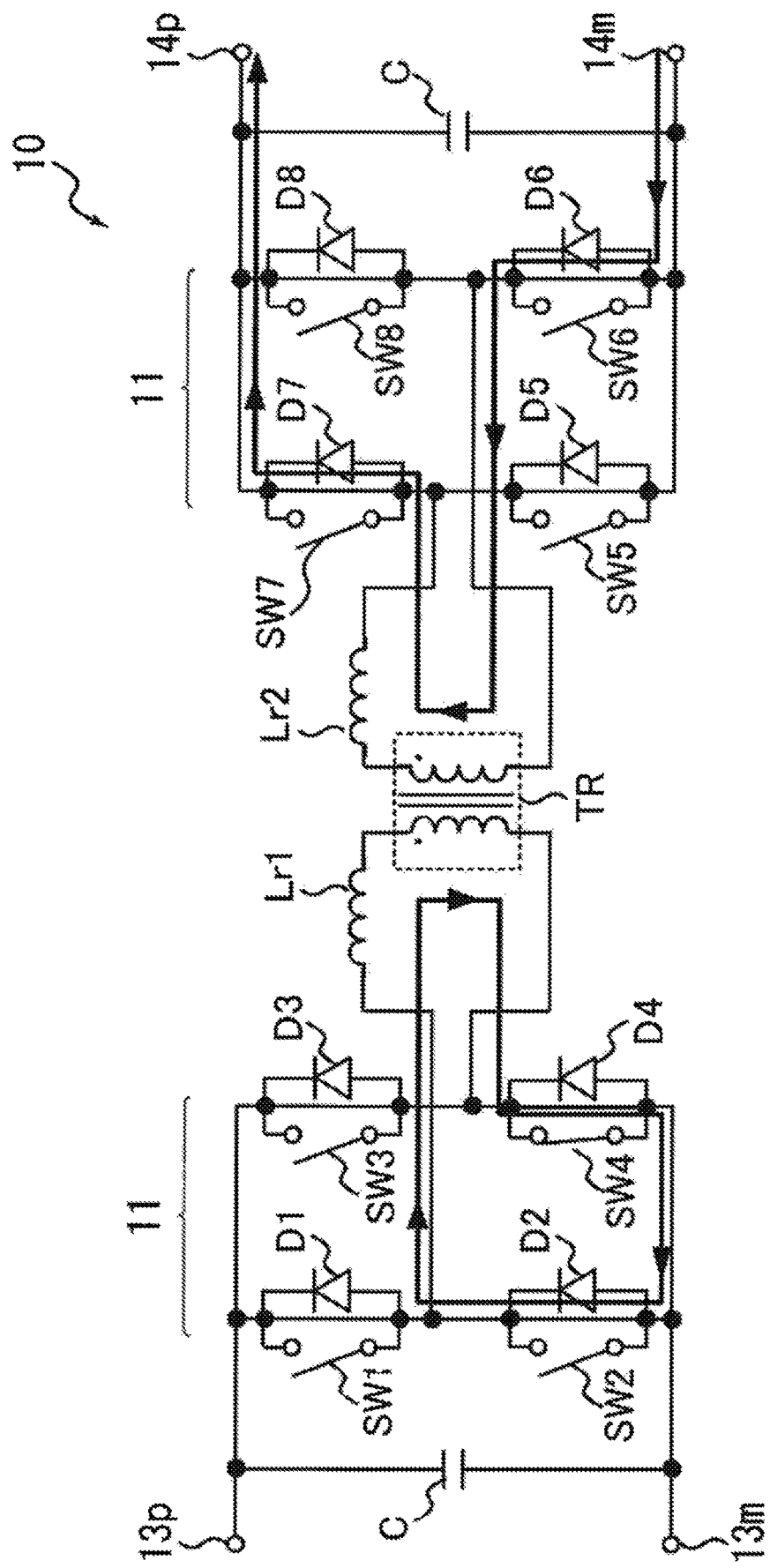
FIG. 2C is a diagram illustrating an electric current route in a third state of the power conversion apparatus in Example 1 of the disclosure.

When the state of the DC/DC converter 10 transitions to the third state (#3), the first switching element SW1 is turned off. Hence, as illustrated in FIG. 2C, with the energy accumulated in the first reactor Lr1, the electric current is circulated in a route of the diode D2, the first reactor Lr1, the transformer TR, and the fourth switching element SW4. As a result, the energy accumulated in the first reactor Lr1 is transmitted to the secondary side to be added to the energy accumulated in the second reactor Lr2, and an electric current rectified by the second full bridge circuit 11 is output from the second input/output terminal pair 14.

The magnitude of the circulated electric current in the third state (#3) decreases as the energy accumulated in the first reactor and the second reactor is transmitted to the secondary side.

Figure 2D:
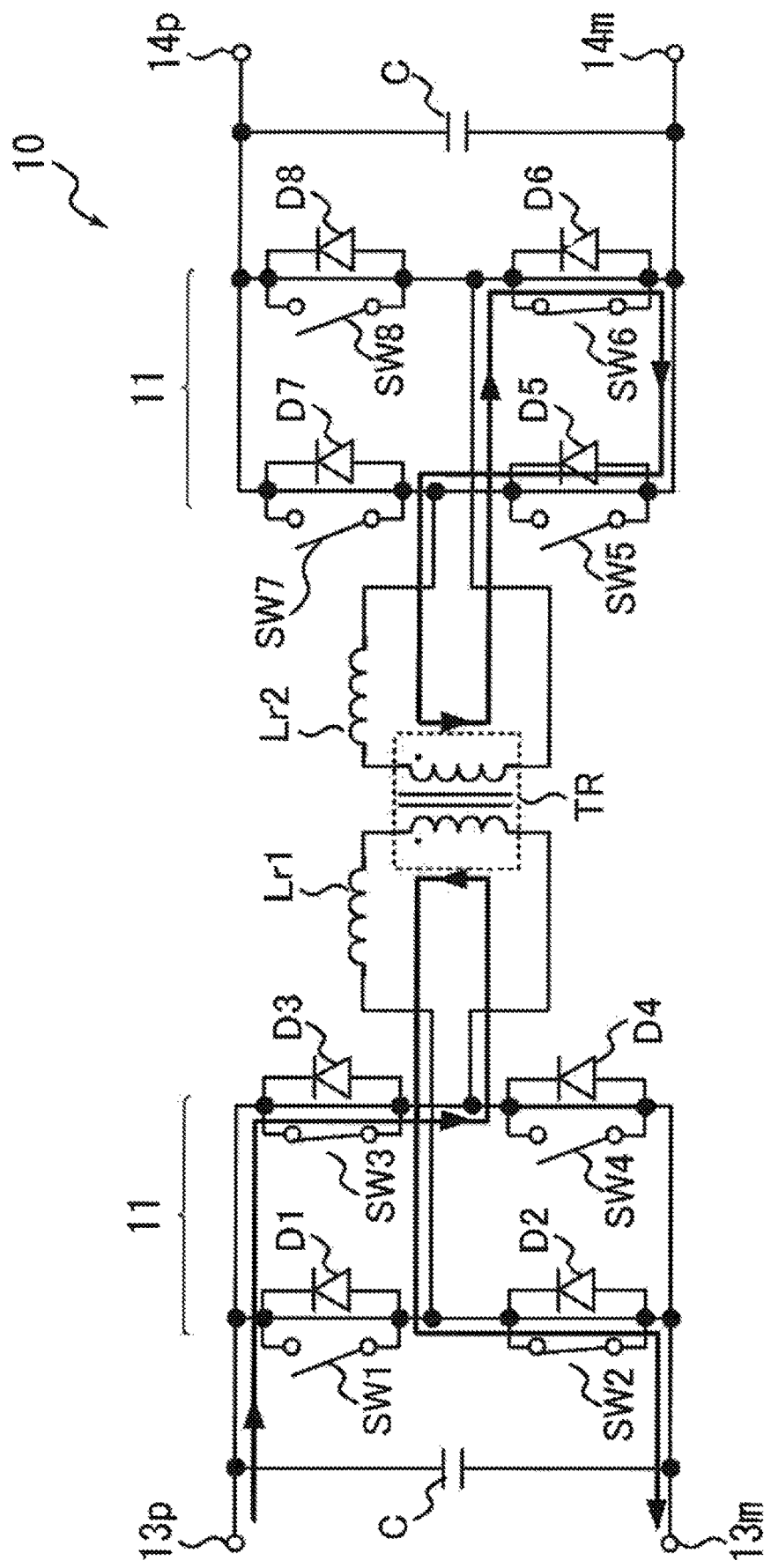
FIG. 2D is a diagram illustrating an electric current route in a fourth state of the power conversion apparatus in Example 1 of the disclosure.

When the state of the DC/DC converter 10 transitions from the third state (#3) to the fourth state (#4), as illustrated in FIG. 2D, an electric current flows in a route from the first input/output terminal 13*p* through the third switching element SW3→the transformer TR→the first reactor Lr1→the second switching element SW2→the first input/output terminal 13*m*. Hence, energy is accumulated in the first reactor Lr1, and the electric current is transmitted to the secondary side via the transformer TR. However, the sixth switching element SW6 is turned on, and thus an electric current is circulated in a route of the diode D5→the second reactor Lr2→the transformer TR→the sixth switching element SW6 at the secondary side of the DC/DC converter 10, as illustrated in FIG. 2D. Hence, the energy from the primary side is accumulated in the second reactor in the fourth state (#4).

Figure 2E:
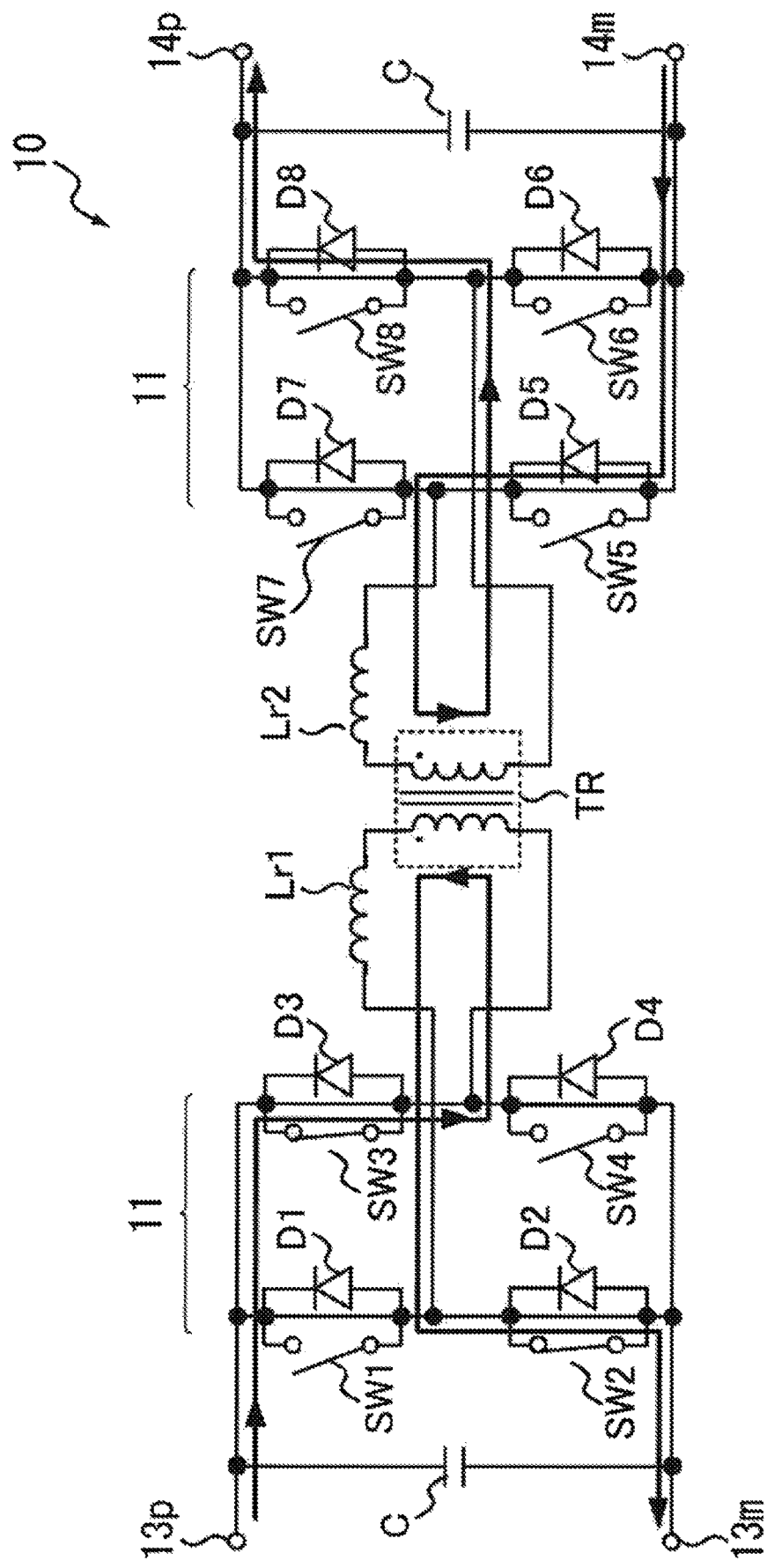
FIG. 2E is a diagram illustrating an electric current route in a fifth state of the power conversion apparatus in Example 1 of the disclosure.

When the sixth switching element SW6 is turned off and the state of the DC/DC converter 10 transitions to the fifth state (#5), as illustrated in FIG. 2E, the energy accumulated in the second reactor Lr2 and the energy from the power supply are transmitted to the secondary side, and the electric current rectified by the second full bridge circuit 11 is output from the second input/output terminal pair 14.

The output voltage of the load is applied to the second input/output terminal pair 14. Therefore, an input current, the input-side Lr current, and the output current in the fifth state (#5) gradually decrease as illustrated in FIG. 4 when the output voltage is higher than the input voltage. Conversely, when the input voltage is higher than the output voltage, the currents gradually increase as illustrated in FIG. 5.

Figure 2F:
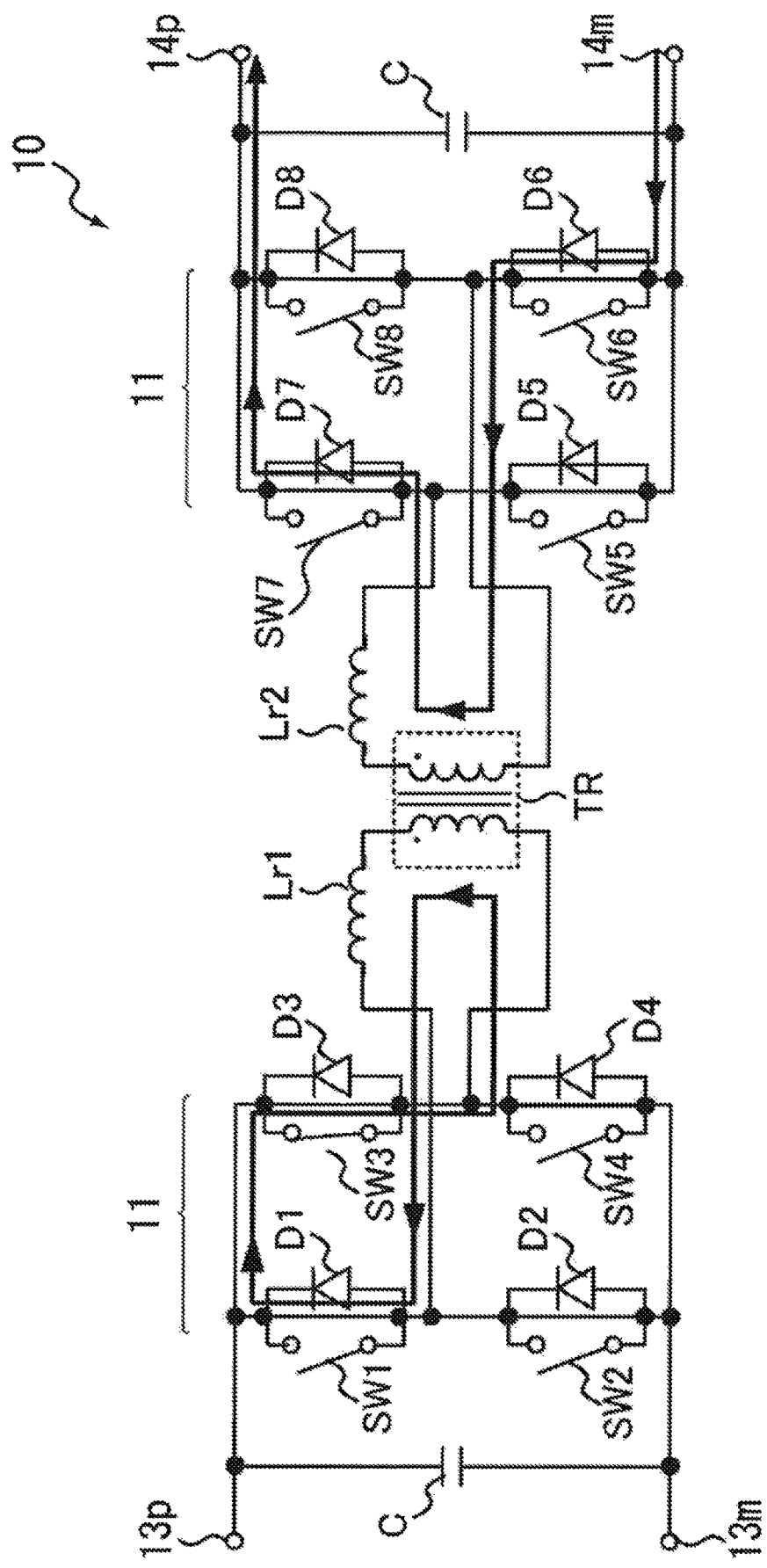
FIG. 2F is a diagram illustrating an electric current route in a sixth state of the power conversion apparatus in Example 1 of the disclosure.

When the second switching element SW2 is turned off and the state of the DC/DC converter 10 transitions to the sixth state (#6), as illustrated in FIG. 2F, with the energy accumulated in the first reactor Lr1, an electric current is circulated in a route of the third switching element SW3→the transformer TR→the first reactor Lr1→the diode D1. Therefore, the energy accumulated in the first reactor Lr1 and the energy accumulated in the second reactor Lr2 are added and are transmitted to the secondary side.

The magnitude of the circulated electric current in the sixth state (#6) also decreases as the energy accumulated in the first reactor Lr1 and the second reactor Lr2 is transmitted to the secondary side.

From the sixth state (#6), the second switching element SW2 is turned off, the first switching element SW1, the fourth switching element SW4, and the fifth switching element SW5 are turned on, the state of the DC/DC converter 10 transitions to the first state (#1), and the above-described transition is repeated.

In this example, when, in the control signals G1 to G6 illustrated in FIG. 3, Ton represents periods of the first state (#1) and the fourth state (#4), Toff1 represents periods of the second state (#2) and the fifth state (#5), and Toff2 represents periods of the third state (#3) and the sixth state (#6), the first switching element SW1 and the third switching element SW3 are turned off earlier than the fourth switching element SW4 and the second switching element SW2, respectively, and thereby the third state (#3) and the sixth state (#6) are realized. FIG. 4 illustrates a change in reactor current when such control causes the DC/DC converter 10 to operate a step-up operation, and FIG. 5 illustrates a change in reactor current when a step-down operation is performed. As illustrated in FIG. 4 and FIG. 5, in the third state (#3) and the sixth state (#6), the reactor current rapidly decreases, and thus a step-up ratio decreases when Toff2 is elongated. In this manner, it is possible to control the step-up ratio by the length of Toff2.

When T represents a switching cycle, Toff2=T−Ton−Toff1, and thus control of Ton and Toff1 enables the control of the step-up ratio in cases including the case when the step-up ratio is 1 or lower. That is, in the DC/DC converter 10, the control of Ton and Toff1 enables implementation of the step-up/step-down operation. Ton and Toff1 are parameters independent from each other.

However, in the step-down operation, energy is supplied from the primary side to the secondary side in periods of Ton and Toff1, that is, periods of the first state (#1) and the second state (#2) and periods of the fourth state (#4) and the fifth state (#5), and thus it is necessary to simultaneously perform an increase and a decrease of Ton and an increase and a decrease of Toff1. Therefore, in this example, Ton and Toff are maintained in a constant relationship and the step-up ratio is controlled. Here, when k represents a maximum step-up ratio to be obtained in a design, Ton and Toff1 are controlled to satisfy the following relationship.

$$Toff1 = Ton/(k-1) \quad (1)$$

Hence, Ton is controlled on a premise that Ton and Toff1 satisfy the relationship of Equation (1), and thereby it is possible to continuously perform control from the step-down operation to the step-up operation. Here, the maximum step-up ratio k which is obtained at a design corresponds to a predetermined coefficient k.

Figure 6:
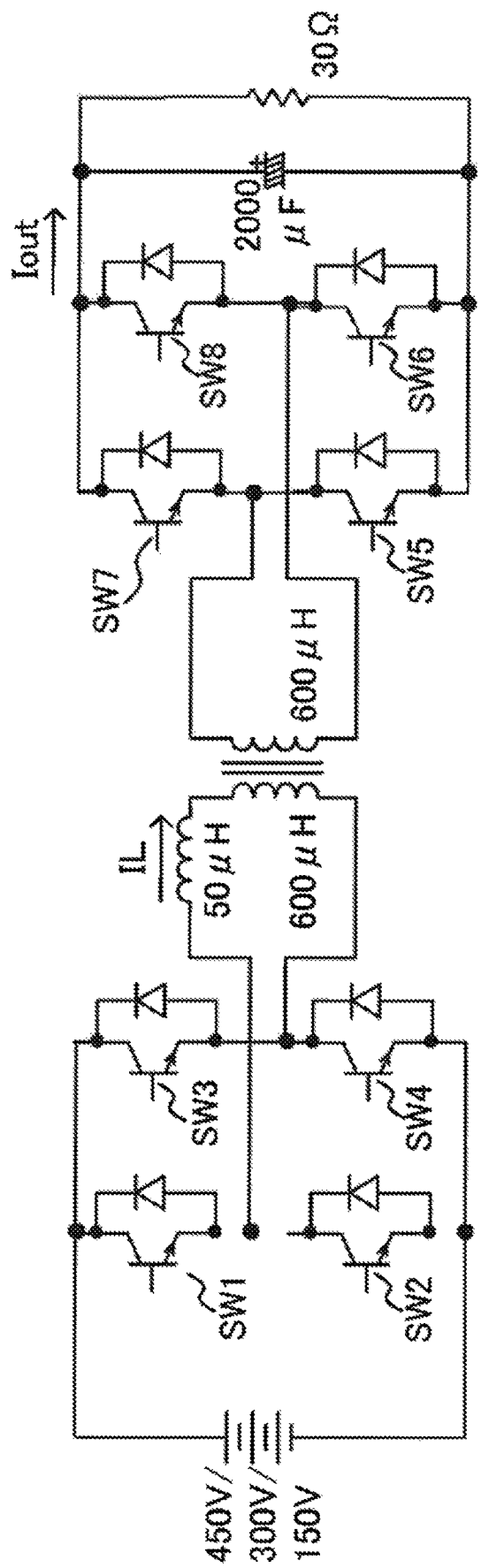
FIG. 6 is a schematic configurational diagram illustrating a simulation circuit of the power conversion apparatus according to Example 1 of the disclosure.

Simulation results of the above-described control are as follows. FIG. 6 illustrates a configuration of a circuit used in the simulation. The simulation circuit is a DAB DC/DC converter in which a DC power supply is connected to an input/output terminal at a primary side, and a load resistor is connected to an input/output terminal at a secondary side. Simulations of three cases were performed in which 450 V, 300 V, and 150 V are input as an input voltage Vin, respectively. An inductance of a reactor element of the simulation circuit was 50 μH, both inductances of a primary-side winding wire and a secondary-side winding wire of a transformer were 600 μH, capacitance of a smoothing capacitor at the secondary side was set to 2,000 μF, and a resistance value of the load resistor was set to 30Ω.

Figure 9A:
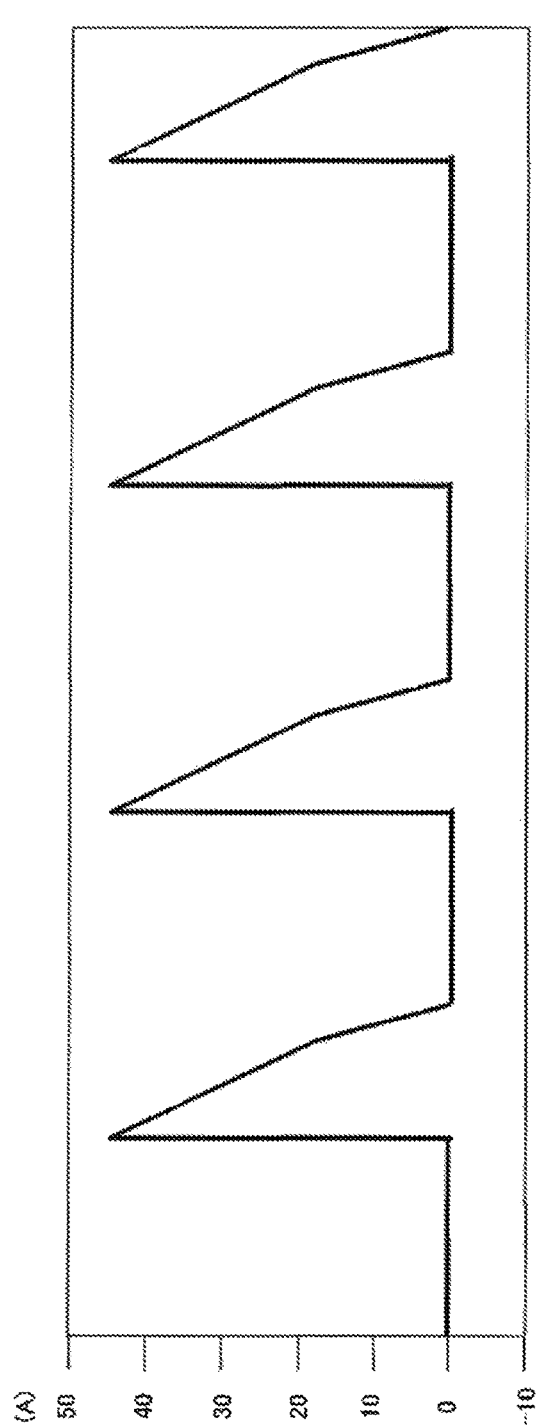
FIG. 9A and FIG. 9B are graphs illustrating still another simulation result in Example 1 of the disclosure.
Figure 9B:
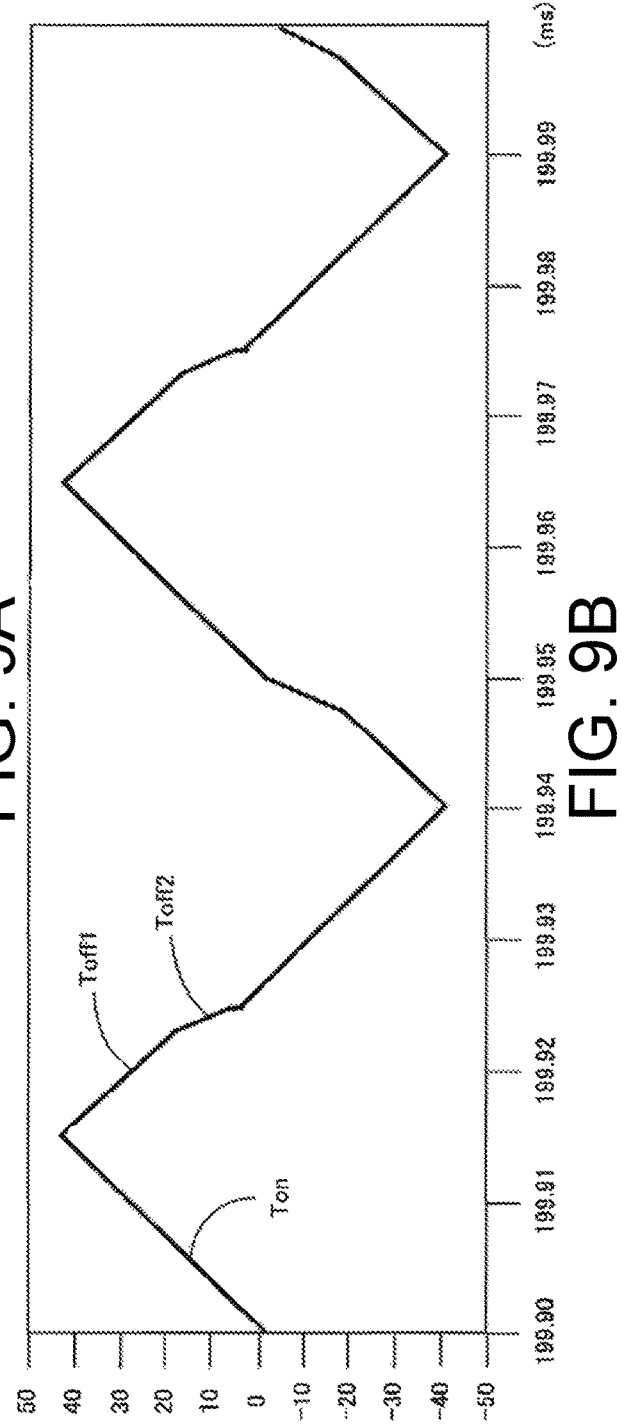

FIG. 7A and FIG. 7B illustrate simulation results in a case where the input voltage Vin=450 V, an output power P=3 kW, Ton=4.4 μsec, switching frequency fsw=20 kHz, and k=3. FIG. 7A illustrates an output current Iout, and FIG. 7B illustrates a reactor current IL. FIG. 8A and FIG. 8B illustrate simulation results in a case where the input voltage Vin=300 V, the electric power P=3 kW, Ton=7 μsec, the switching frequency fsw=20 kHz, and k=3. FIG. 8A illustrates the output current Iout, and FIG. 8B illustrates the reactor current IL. FIG. 9A and FIG. 9B illustrate simulation results in a case where the input voltage Vin=150 V, the electric power P=3 kW, Ton=15 μsec, the switching frequency fsw=20 kHz, and k=3. FIG. 9A illustrates the output current Iout, and FIG. 9B illustrates the reactor current IL. In all of FIG. 7A to FIG. 9B, an output voltage Vout=300 V. Ton is set to be elongated from FIG. 7A to FIG. 9A, and Ton is controlled such that FIG. 7A and FIG. 7B illustrate a step-down operation and FIG. 9A and FIG. 9B illustrate a step-up operation, and thereby the step-down operation to the step-up operation can be continuously performed, which is also proved by the simulation results.

In this manner, according to the DC/DC converter 10 of this example, it is possible to continuously perform the step-up/step-down operations, and it is possible to inhibit the output voltage from changing and to realize highly efficient power conversion.

Moreover, in order for configurational elements of the disclosure to be compared with those of the configuration of the example, the configurational elements of the disclosure are described by assigning the reference signs of the drawings thereto.

<Invention 1>

A power conversion apparatus includes:

a first input/output terminal pair (13p and 13m);

a second input/output terminal pair (14p and 14m);

a DC/DC converter (10) connected to the first input/output terminal pair (13p and 13m) and the second input/output terminal pair (14p and 14m); and a controller (20) that controls the DC/DC converter;

wherein the DC/DC converter 10 includes:

a first switching leg which has first and second switching elements (SW1 and SW2) that are connected in series via a first connection point (p1) and which is connected to the first input/output terminal pair (13p and 13m);

a second switching leg which has third and fourth switching elements (SW3 and SW4) that are connected in series via a second connection point (p2) and which is connected to the first switching leg in parallel;

a third switching leg which has fifth and seventh switching elements (SW5 and SW7) that are connected in series via a third connection point and which is connected to the second input/output terminal pair (14p and 14m);

a fourth switching leg which has sixth and eighth switching elements (SW6 and SW8) that are connected in series via a fourth connection point (p4) and which is connected to the third switching leg in parallel;

a first energy accumulating/converting unit which is connected to the first connection point (p1) and the second connection point (p2) and includes one winding wire of a transformer (TR); and a second energy accumulating/converting unit which is connected to the third connection point (p3) and the fourth connection point (p4) and includes the other winding wire of the transformer (TR);

wherein at least one of the first energy accumulating/converting unit and the second energy accumulating/converting unit has a reactor (Lr1, Lr2) which is connected to the winding wires of the transformer (TR) in series, wherein in a state that the seventh switching element (SW7) and the eighth switching element (SW8) are turned off, the controller (20) has a first state that the first switching element (SW1) and the fourth switching element (SW4) are turned on, the second switching element (SW2) and the third switching element (SW3) are turned off, the fifth switching element (SW5) is turned on, and the sixth switching element (SW6), a second state that the first switching element (SW1) and the fourth switching element (SW4) are turned on, the second switching element (SW2) and the third switching element (SW3) are turned off, and the fifth switching element (SW5) and the sixth switching element (SW6) are turned off, a third state that the first switching element (SW1) is turned off, the fourth switching element (SW4) is turned on, the second switching element (SW2) and the third switching element (SW3) are turned off, and the fifth switching element (SW5) and the sixth switching element (SW6) are turned off, a fourth state that the second switching element (SW2) and the third switching element (SW3) are turned on, the first switching element (SW1) and the fourth switching element (SW4) are turned off, the sixth switching element (SW6) is turned on, and the fifth switching element (SW5) is turned off, a fifth state that the second switching element (SW2) and the third switching element (SW3) are turned on, the first switching element (SW1) and the fourth switching element (SW4) are turned off, and the fifth switching element (SW5) and the sixth switching element (SW6) are turned off, and a sixth state that the third switching element (SW3) is turned on, the second switching element (SW2) is turned off, the first switching element (SW1) and the fourth switching element (SW4) are turned off, and the fifth switching element (SW5) and the sixth switching element (SW6) are turned off, and the controller repeats and executes transition from the first state, the second state, the third state, the fourth state, the fifth state, and the sixth state in this order, and wherein the controller controls periods of the third state and the sixth state.

According to the disclosure, an electric current flows from one of the first input/output terminal pair to the first energy accumulating/converting unit in the first state, and energy accumulated by allowing an electric current to flow from the one of the first input/output terminal pair to the second energy accumulating/converting unit via the transformer is output from the second input/output terminal pair in the second state. Besides, energy accumulated by allowing an electric current to flow from the other of the first input/output terminal pair to the first energy accumulating/converting unit and the second energy accumulating/converting unit in the fourth state can be output from the second input/output terminal pair in the fifth state. At this time, when the direction of the electric current flowing to the first energy accumulating/converting unit is switched from one to the other or from the other to the one, the third state and the sixth state are arranged. The first switching element and the third switching element which are connected to a side of the first input/output terminal pair are turned off before the fourth switching element and the second switching element, respectively, and thereby it is possible to more rapidly decrease electric currents flowing to the first energy accumulating/converting unit and the second energy accumulating/converting unit, toward a timing when the direction of the electric current flowing to the first switching element is switched. It is possible to change a step-up/step-down ratio by controlling periods of the third state and the sixth state, and it is possible to continuously perform a step-up/step-down operation. Hence, it is possible to suppress an output voltage from changing. In addition, since it is possible to more rapidly decrease the electric current toward the timing when the direction of the electric current flowing to the first energy accumulating/converting unit is switched, it is possible to decrease a switching loss so as to realize high efficiency.

Here, at least one of the first energy accumulating/converting unit and the second energy accumulating/converting unit has a reactor which is connected to the winding wires of the transformer in series. That is, the first energy accumulating/converting unit may have a first reactor which is connected to one winding wire of the transformer in series. In addition, the second energy accumulating/converting unit may have a second reactor which is connected to the other winding wire of the transformer in series. Further, it may be that the first energy accumulating/converting unit has a first reactor which is connected to one winding wire of the transformer in series, and the second energy accumulating/converting unit has a second reactor which is connected to the other winding wire of the transformer in series. A leakage inductance which occurs at a side of the one winding wire of the transformer may be used as the first reactor, and a leakage inductance which occurs at a side of the other winding wire of the transformer may be used as the second reactor.

In addition, in the disclosure, when Ton represents periods of the first state and the fourth state and Toff1 represents periods of the second state and the fifth state, the periods of the third state and the sixth state may be controlled by controlling Ton and Toff1 such that Toff1=Ton/(k−1) is satisfied for a predetermined coefficient k.

When a switching cycle is set, controlling of the periods of the third state and the sixth state means controlling of Ton+Toff1. At this time, Ton and Toff1 are parameters independent from each other and it is not easy to independently control the two parameters. Therefore, when there is a constant relationship between Ton and Toff1, it is preferable to have one parameter to be controlled. As the relationship between Ton and Toff1, it is possible to set a relationship of Toff1=Ton/(k−1), when k represents the highest step-up ratio which is obtained from a design of the power conversion apparatus. In this manner, Ton is controlled, and thereby it is possible to suppress the output voltage from changing and to more simply realize a power conversion apparatus that is capable of achieving high efficiency.

According to the disclosure, it is possible to suppress an output voltage from changing and to realize high efficiency in a power conversion apparatus that is capable of performing a step-up/step-down operation.

What is claimed is:

1. A power conversion apparatus comprising:
a first input/output terminal pair;
a second input/output terminal pair;
a DC/DC converter connected to the first input/output terminal pair and the second input/output terminal pair; and
a controller that controls the DC/DC converter,
wherein the DC/DC converter comprises:
a first switching leg which has a first switching element and a second switching element that are connected in series via a first connection point and which is connected to the first input/output terminal pair:
a second switching leg which has a third switching element and a fourth switching element that are connected in series via a second connection point and which is connected to the first switching leg in parallel;
a third switching leg which has a fifth switching element and a seventh switching element that are connected in series via a third connection point and which is connected to the second input/output terminal pair;
a fourth switching leg which has a sixth switching element and an eighth switching element that are connected in series via a fourth connection point and which is connected to the third switching leg in parallel;
a first energy accumulating/converting unit which is connected to the first connection point and the second connection point and includes one winding wire of a transformer; and
a second energy accumulating/converting unit which is connected to the third connection point and the fourth connection point and includes another winding wire of the transformer,
wherein at least one of the first energy accumulating/converting unit and the second energy accumulating/converting unit has a reactor which is connected to the winding wires of the transformer in series,
wherein the controller has,
in a state that the seventh switching element and the eighth switching element are turned off,
a first state that the first switching element and the fourth switching element are turned on, the second switching element and the third switching element are turned off, the fifth switching element is turned on, and the sixth switching element is turned off,
a second state that the first switching element and the fourth switching element are turned on, the second switching element and the third switching element are turned off, and the fifth switching element and the sixth switching element are turned off,
a third state that the first switching element is turned off, the fourth switching element is turned on, the second switching element and the third switching element are turned off, and the fifth switching element and the sixth switching element are turned off,
a fourth state that the second switching element and the third switching element are turned on, the first switching element and the fourth switching element are turned off, the sixth switching element is turned on, and the fifth switching element is turned off,
a fifth state that the second switching element and the third switching element are turned on, the first switching element and the fourth switching element are turned off, and the fifth switching element and the sixth switching element are turned off, and
a sixth state that the third switching element is turned on, the second switching element is turned off, the first switching element and the fourth switching element are turned off, and the sixth switching element and the fifth switching element are turned off, and the controller repeats and executes a transition from the first state, the second state, the third state, the fourth state, the fifth state, and the sixth state in this order, and
wherein the controller controls periods of the third state and the sixth state,
wherein, when Ton represents periods of the first state and the fourth state and Toff1 represents periods of the second state and the fifth state, the periods of the third state and the sixth state are controlled by controlling Ton and Toff1 such that Toff1=Ton/(k−1) is satisfied for a predetermined coefficient k.

\* \* \* \* \*